US012040120B2

(12) United States Patent
Su et al.

(10) Patent No.: US 12,040,120 B2
(45) Date of Patent: Jul. 16, 2024

(54) PREPARATION METHOD FOR AN INDUCTANCE COMPONENT

(71) Applicant: Shenzhen Sunlord Electronics Co., Ltd., Guangdong (CN)

(72) Inventors: Qiang Su, Guangdong (CN); Xinshu Yu, Guangdong (CN); Shengcheng Xia, Guangdong (CN); Youyun Li, Guangdong (CN)

(73) Assignee: Shenzhen Sunlord Electronics Co., Ltd., Guangdong (CN)

( * ) Notice: Subject to any disclaimer, the term of this patent is extended or adjusted under 35 U.S.C. 154(b) by 599 days.

(21) Appl. No.: 17/211,811

(22) Filed: Mar. 24, 2021

(65) Prior Publication Data

US 2021/0210275 A1 Jul. 8, 2021

Related U.S. Application Data

(63) Continuation of application No. PCT/CN2019/113774, filed on Oct. 28, 2019.

(30) Foreign Application Priority Data

Jul. 25, 2019 (CN) ......................... 201910678060.1

(51) Int. Cl.
*H01F 7/06* (2006.01)
*H01F 27/24* (2006.01)
(Continued)

(52) U.S. Cl.
CPC ......... *H01F 27/2823* (2013.01); *H01F 27/24* (2013.01); *H01F 41/0206* (2013.01); *H01F 41/04* (2013.01)

(58) Field of Classification Search
CPC .. H01F 41/0206; H01F 41/0246; H01F 41/04; H01F 27/24; H01F 27/2823; H01F 17/04; H01F 2017/048
See application file for complete search history.

(56) References Cited

U.S. PATENT DOCUMENTS 5,695,110 A * 12/1997 Schirmer .............. H01R 12/58 29/839
6,214,921 B1 * 4/2001 Bluett .................... H01R 13/03 524/495
(Continued)

FOREIGN PATENT DOCUMENTS

CN 101901683 12/2010
CN 102365693 2/2012
(Continued)

*Primary Examiner* — Paul D Kim
(74) *Attorney, Agent, or Firm* — Winston Hsu

(57) ABSTRACT

A preparation method for an inductance component, comprising: prefabricating a continuous coil row containing a plurality of hollow coils with the connections of every two adjacent hollow coils being bent feet; placing the continuous coil row into a cavity of a prefabricated mold, the cavity comprising a plurality of sub-chambers and one sub-chamber being used for placing a hollow coil; injecting the prepared soft-magnetic magnetic glue into the cavity to enable the soft-magnetic magnetic glue to coat the hollow coil, and simultaneously exposing the bent feet to the outside to perform magnet forming; cutting the formed semi-finished product; and peeling the exposed bent foot copper wire, and performing metallization to form an electrode to obtain a finished product of the inductance component. The invention has high inductance preparation efficiency, and the obtained product electrode has no risks of a dry joint, poor contact, and the like.

6 Claims, 3 Drawing Sheets

(51) Int. Cl.

| | |
|---|---|
| ***H01F 27/28*** | (2006.01) |
| ***H01F 41/02*** | (2006.01) |
| ***H01F 41/04*** | (2006.01) |

(56) References Cited

U.S. PATENT DOCUMENTS

| | | | | |
|---|---|---|---|---|
| 2002/0110958 | A1* | 8/2002 | Hamatani | C23C 18/1653 438/129 |
| 2002/0149455 | A1* | 10/2002 | Mehnert | H01R 13/504 335/205 |
| 2004/0212053 | A1* | 10/2004 | Koh | H01L 24/06 257/E23.032 |
| 2014/0338185 | A1 | 11/2014 | Muneuchi | |
| 2018/0218825 | A1* | 8/2018 | Sato | H01F 41/0233 |
| 2021/0351652 | A1* | 11/2021 | Yu | H02K 3/28 |

FOREIGN PATENT DOCUMENTS

| | | |
|---|---|---|
| CN | 105355408 | 2/2016 |
| CN | 106415746 | 2/2017 |
| CN | 110517859 | 11/2019 |

* cited by examiner

PREPARATION METHOD FOR AN INDUCTANCE COMPONENT

CROSS REFERENCE TO RELATED APPLICATIONS

This application is a continuation application of PCT/CN2019/113774 filed on 2019 Oct. 28, which claims priority to CN patent application NO. 201910678060.1 filed on 2019 Jul. 25. The contents of the above-mentioned application are all hereby incorporated by reference.

BACKGROUND OF THE INVENTION

1. Field of the Invention

The invention relates to an inductance component and a preparation method thereof.

2. Description of the Prior Art

The 5G era has arrived. The information industry's demand for electronic components is increasing and the requirements are getting higher and higher. Inductance is an important part of the information world. At present, all kinds of inductances have come out. The high saturation, high frequency, and high Q characteristics of mold pressed inductance have been favored by the market. The traditional integrally formed inductance has reached a certain bottleneck in the manufacturing process, and it is difficult to make major breakthroughs.

According to the traditional integrally formed inductance, it is basically a single piece placed in a cavity and mold pressed, so that the efficiency is low; the pre-winding, assembling and other processes also take a significant amount of time, which limits the manufacturing efficiency of the product.

The disclosure of the above background art content is only used to assist the understanding of the inventive concept and technical scheme of the present invention. It does not necessarily belong to the prior art of this patent application. In the absence of clear evidence that the above content has been disclosed before the filing date of this patent application, the above background art should not be used to evaluate the novelty and inventiveness of the application.

SUMMARY OF THE INVENTION

The invention mainly aims at overcoming the problem of low preparation efficiency of the existing integrally formed inductance, and provides an inductance component formed by transfer molding and a preparation method thereof. According to the method, the single piece inductance, the coupled inductance, or the inductance row are manufactured through a molding for once forming, so that different manufacturing requirements are met, and meanwhile, the advantages of high saturation, high frequency, and high Q are achieved.

The invention provides the following technical scheme for achieving the above aim:

an inductance component, comprising: a hollow coil, which is a unit in a prefabricated continuous coil row, with two ends of the hollow coil bending to form bent feet; and a magnet formed by coating the hollow coil with soft-magnetic magnetic glue; wherein the bent feet are exposed outside the magnet and are flush with the bottom of the magnet, and the copper wires of the bent feet are peeled and then metalized to form electrodes of the inductance component.

Preferably, the prefabricated continuous coil row is obtained by continuously winding round copper wire or flat copper wire according to a coil shape required by the inductance component. After the hollow coil is coated by soft-magnetic magnetic glue, the magnet is formed by cold pressing, hot pressing, glue filling, or transfer molding.

To achieve the above aim, the invention further provides a preparation method for an inductance component for preparing inductance component. The preparation method comprises the following steps:

S1, prefabricating a continuous coil row containing a plurality of hollow coils with connections of every two adjacent hollow coils being bent feet;

S2, placing the continuous coil row into a cavity of a prefabricated mold, the cavity comprising a plurality of sub-chambers and one sub-chamber being used for placing a hollow coil;

S3, injecting the prepared soft-magnetic magnetic glue into the cavity to enable the soft-magnetic magnetic glue to coat the hollow coil, and simultaneously exposing the bent feet to the outside to perform magnet forming;

S4, cutting the formed semi-finished product; and

S5, peeling the exposed bent foot copper wire, and performing metallization to form an electrode to obtain a finished product of the inductance component.

Preferably:

step S1 comprises steps as follows: for a plurality of jig cores in a winding tool, when a first coil is wound, a first jig core is ejected out of a preset height, and the first coil is wound on the first jig core; after the first coil is wound, the first jig core is reset, a second jig core is ejected out of the preset height, a wire length of a preset length is reserved, and then a second coil is wound on the second jig core; winding the continuous coil row is repeatedly completed as such; the preset height is set according to a distance between the jig cores and a length at a bending position between adjacent hollow coils.

The soft-magnetic magnetic glue comprises a soft magnetic alloy particle, an organic adhesive, a lubricant, and a curing agent.

The soft magnetic alloy particle comprises at least one of Fe—Ni based, Fe—Si—Al based, Fe—Si based, Fe—Si—Cr based and Fe based, and has a particle size of 1-50 μm.

When the hollow coils are coated with the soft-magnetic magnetic glue in step S3, a gap is reserved or not reserved between adjacent hollow coils.

A mode for metalizing the peeled copper wire in step S5 comprises PVD, electroplating, or tin immersion.

Cutting the formed semi-finished product in step S4 specifically comprises: cutting according to an inductance unit, cutting according to a coupled inductance, or cutting according to an inductance row with a plurality of inductances connected.

According to the above technical solution provided by the invention, by prefabricating a continuous coil row and carrying out one-time cladding forming, the production efficiency is greatly improved compared with an existing mode that a single piece is placed into a mold for forming; and the formed product can be cut into a single piece inductance or a coupled inductance and can also serve as an inductance row. On the other hand, after directly winding to a bent foot copper wire formed at the bottom with the coil, peeling is carried out, and then metalizing is directly carried out such that an electrode is formed, and the electrode is integrated with the coil. Compared with a mode that the terminal and side grinding forms the electrode, the electrode forming mode of the invention has no risks of dry joint and poor contact.

DETAILED DESCRIPTION

The present invention will now be described in further detail with reference to the accompanying drawings and specific embodiments.

Figure 1:
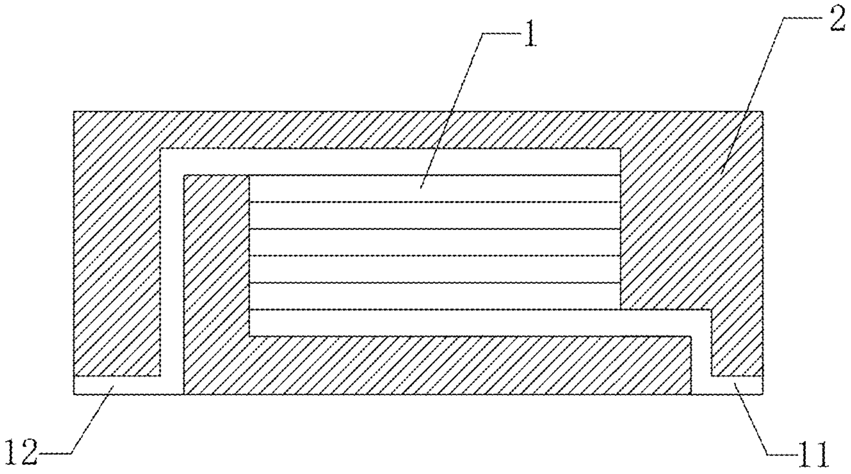
FIG. 1 is a schematic cross-sectional view of a single piece inductance prepared according to the present invention.

The specific embodiments of the invention provide a preparation method for an inductance component, comprising prefabricating a continuous coil row, coating the continuous coil row with soft-magnetic magnetic glue in a cavity of a prefabricated mold for once forming preparation of the inductance component, cutting being carried out after the forming, directly winding to a bent foot formed at the bottom with the coil, peeling being carried out, and then metalizing being carried out such that an electrode is formed. The single piece inductance, the coupling inductance, or the inductance row with stable electrode structure and without the risk of poor contact and dry joint can be efficiently prepared. An exemplary prepared inductance structure is shown in FIG. 1, comprising a hollow coil 1, a unit in a prefabricated continuous coil row, with two ends of the hollow coil bending to form bent foot 11 and bent foot 12; and a magnet 2 formed by coating the hollow coil 1 with soft-magnetic magnetic glue; wherein the bent foot 11 and bent foot 12 are exposed outside the magnet and are flush with the bottom of the magnet 2, and the copper wires of the bent foot 11 and bent foot 12 are peeled and then metalized to form electrodes of the inductance component.

The above preparation method of the invention specifically comprises the following steps S1 to S5.

Figure 2:
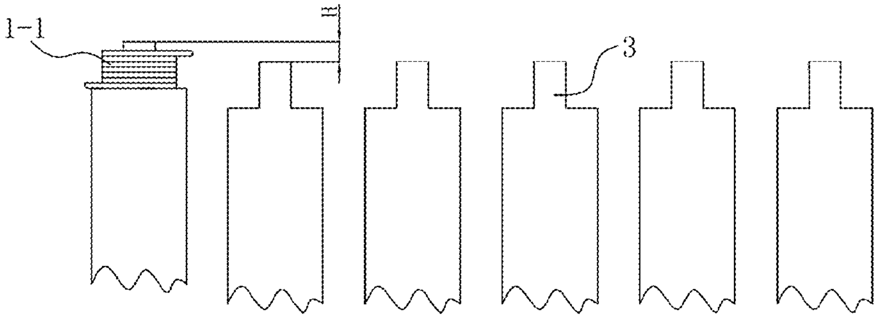
FIG. 2 is a schematic view of a first hollow coil wound when a continuous coil row is prefabricated according to the present invention.
Figure 3:
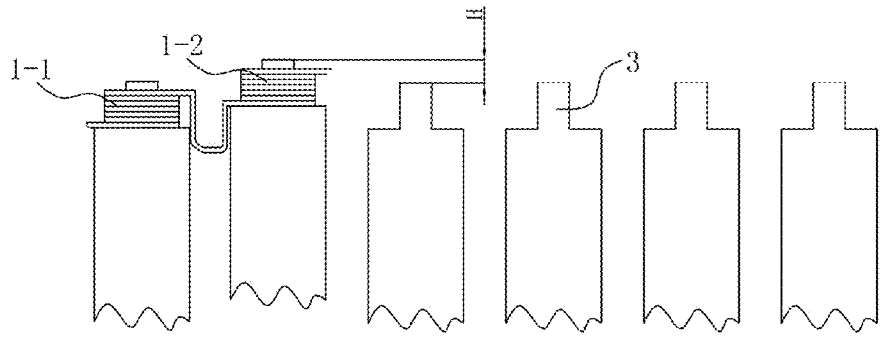
FIG. 3 is a schematic view of a second hollow coil wound when a continuous coil row is prefabricated according to the present invention.
Figure 4:
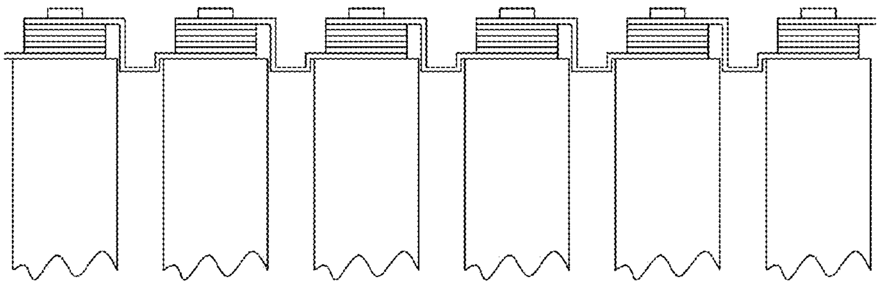
FIG. 4 is a schematic view of completing a continuous coil row winding.
Figure 5:
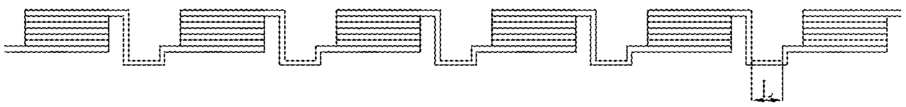
FIG. 5 is a schematic structural view of an exemplary continuous coil row.

Step S1, prefabricating a continuous coil row containing a plurality of hollow coils, with the connection of every two adjacent hollow coils being a bent foot. Referring to FIGS. 2 and 3, the winding tool used in the present invention has a plurality of jig cores 3, which can be arranged in rows (columns) or by an array rule. When a first coil 1-1 (counted from the left side in the figure) is wound, a first jig core on the left side is ejected out of a preset height H and the first coil is wound on the first jig core (starting from bottom to top); after the first coil 1-1 is wound, the first jig core is reset, the second jig core is ejected out of the preset height H, a wire length of a preset length is reserved (which can be calculated according to the height of the coil, the distance between adjacent coils and the bending depth; calculating a neutral layer of the copper wire in a calculation process and setting a correlation coefficient by combining the wire diameters of different copper wires), a second coil 1-2 is wound on a second jig core, and a starting end is fixed by using a fixture during the winding; the process is repeated as such until the winding of the continuous coil row is completed as shown in FIG. 4, then the wound coil row is positioned in a corresponding mold, and the connections between coils are bent with an assorted bending jig to form bent foot, and the step is omitted for products with side outgoing lines, so that a continuous coil row shown in FIG. 5 as an example can be obtained. The ejected height H of the jig core 3 is set according to the distance between the jig cores and the length L of the bending positions between adjacent hollow coils, the length L of the bending positions can be defined according to the outer contour size of a product or the distance between the coils, and if the length of the magnet is large, the length L is correspondingly increased. When the coil is wound, flat copper wire vertical winding or opposing winding is carried out to form a coil row such as a racetrack shape according to the requirement of the size of a product and the coil shape; alternatively, round copper wire flying fork winding, outer winding, or opposing winding is used to form a coil row of a shape such as a racetrack shape or hollow cylinder.

Step S2, placing the continuous coil row into a cavity of a prefabricated mold, the cavity comprising a plurality of sub-chambers and one sub-chamber being used for placing a hollow coil.

Step S3, injecting the prepared soft-magnetic magnetic glue into the cavity to enable the soft-magnetic magnetic glue to coat the hollow coil, and simultaneously exposing the bent foot to the outside to perform magnet forming. In a specific example, the soft-magnetic magnetic glue comprises a soft magnetic alloy particle, an organic adhesive, a lubricant, and a curing agent. The soft magnetic alloy particle comprises at least one of Fe—Ni based, Fe—Si—Al based, Fe—Si based, Fe—Si—Cr based and Fe based, and has a particle size of 1-50 μm. When the soft-magnetic magnetic glue is used for coating, a gap can be reserved between adjacent coils and a gap can also not be reserved. In the case where a gap is reserved, the copper wire end protruding from the side surface of the magnet should be cut away when the semi-finished product is cut subsequently. It will be appreciated that the presence or absence of a gap during coating requires a corresponding design of the cavity of the mold in advance. The magnet may be formed, for example, by hot pressing, cold pressing, glue filling, or transfer molding.

Figure 6:
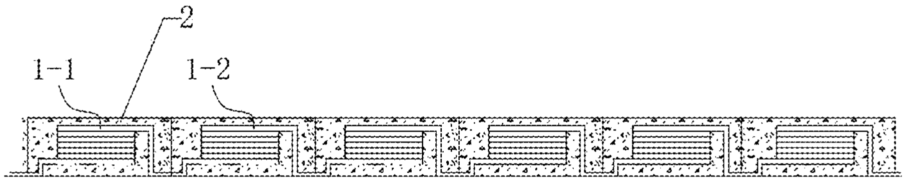
FIG. 6 is a schematic cross-sectional view of a formed semi-finished product.
Figure 7:
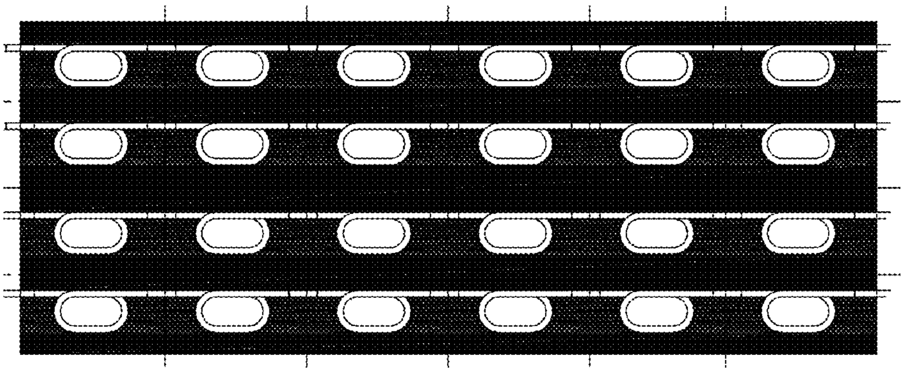
FIG. 7 is a schematic top view of a once forming semi-finished product by coating a plurality of continuous coil rows with soft-magnetic magnetic glue.

Step S4, after forming in step S3, a semi-finished product, an inductance row formed by a plurality of inductances, shown in FIGS. 6 and 7 is obtained, and in this step the formed semi-finished product is cut; for example, cutting by unit to obtain a single piece inductance, or cutting into a coupled inductance, or cutting into an inductance row containing a plurality of inductances, etc. The semi-finished product can be cut into a single integrally formed inductance with a cutter, and the size of a cutter cutting edge is selected according to the specification size of the inductance. The purpose is to separate products in the same row by cutting once to ensure the size accuracy and the appearance integrity of the products. The cut product is chamfered by adopting a soft grinding medium, the size of the chamfer is changed according to the size of the product, rags and burrs generated during cutting can be removed by the chamfer, and meanwhile, the side electrode required by AOI facilitates the continuity of edge, corner angle, and plane metallization.

Step S5, peeling the exposed bent foot copper wire after the cutting is completed, and performing metallization to form an electrode to obtain a finished product of the inductance component. The way in which the electrode is formed by metallization can be, for example, PVD, electroplating or tin immersion, etc. For the bent foot exposed at the bottom of the magnet, the copper wire of the bent foot can be peeled off in a laser or polishing mode (such as an outer layer film of the enameled copper wire), so that the copper wire substrate, i.e., the conductive portion, can be exposed, and the copper wire substrate can be directly used as an electrode of an inductance component after metallization treatment.

In summary, compared with the prior art, the preparation method provided by the embodiments of the invention and the inductance component prepared by the preparation method have the advantages as follows.

(1) By adopting the continuous coil assembly, the assembling procedure of a conventional product in the early stage can be remitted, the production efficiency is greatly improved, and the production cost is reduced.

(2) In addition, an electrode of the inductance component is formed by directly winding a coil pin, the electrode is integrated with the coil, and compared with a structure adopting a terminal electrode and side grinding, the risk of poor contact and dry joint is avoided. And a novel manufacturing method is provided for manufacturing a single piece inductance, a coupled inductance, or an inductance row.

The foregoing is a further detailed description of the invention in connection with specific preferred embodiments. It cannot be considered that the specific implementation of the present invention is limited to these descriptions. For those skilled in the art to which the present invention belongs, without departing from the concept of the present invention, several equivalent substitutions or obvious variations can be made, and the same performance or use should be regarded as belonging to the protection scope of the present invention.

What is claimed is:

1. A preparation method for an inductance component, which is used for preparing the inductance component, characterized by comprising the following steps:

S1, prefabricating a continuous coil row containing a plurality of hollow coils with connections of every two adjacent hollow coils being bent feet; wherein, for a plurality of jig cores in a winding tool, when a first coil is wound, a first jig core is ejected out of a preset height, and the first coil is wound on the first jig core; after the first coil is wound, the first jig core is reset, a second jig core is ejected out of the preset height, a wire length of a preset length is reserved, and then a second coil is wound on the second jig core; and winding the continuous coil row is repeatedly completed as such; wherein the preset height is set according to a distance between the jig cores and a length at a bending position between adjacent hollow coils;

S2, placing the continuous coil row into a cavity of a prefabricated mold, the cavity comprising a plurality of sub-chambers and one sub-chamber being used for placing a hollow coil;

S3, injecting a prepared soft-magnetic magnetic glue into the cavity to enable the soft-magnetic magnetic glue to coat the hollow coil, and simultaneously exposing the bent feet to the outside to perform magnet forming, wherein the bent feet are exposed outside the magnet and are flush with a bottom of the magnet;

S4, cutting the magnet; and

S5, peeling the bent feet having been exposed outside the magnet and been flush with the bottom of the magnet, and performing metallization to form an electrode.

2. The preparation method for an inductance component of claim 1, characterized in that the soft-magnetic magnetic glue comprises a soft magnetic alloy particle, an organic adhesive, a lubricant, and a curing agent.

3. The preparation method for an inductance component of claim 2, characterized in that the soft magnetic alloy particle comprises at least one of Fe—Ni based, Fe—Si—Al based, Fe—Si based, Fe—Si—Cr based and Fe based, and has a particle size of 1-50 μm.

4. The preparation method for an inductance component of claim 1, characterized in that when the hollow coils are coated with the soft-magnetic magnetic glue in step S3, a gap is reserved or not reserved between adjacent hollow coils.

5. The preparation method for an inductance component of claim 1, characterized in that a mode for metalizing peeled copper wire in step S5 comprises PVD, electroplating, or tin immersion.

6. The preparation method for an inductance component of claim 1, characterized in that cutting the magnet in step S4 specifically comprises: cutting according to an inductance unit, cutting according to a coupled inductance, or cutting according to an inductance row with a plurality of inductances connected.

* * * * *